United States Patent
Leban et al.

(10) Patent No.: US 7,490,133 B1
(45) Date of Patent: Feb. 10, 2009

(54) CONTEXT-SENSITIVE CONTENT LEVEL SEMANTIC INFORMATION PROPAGATION SYSTEM AND METHOD

(75) Inventors: Roy Leban, Redmond, WA (US); Saveen Reddy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1221 days.

(21) Appl. No.: 10/465,384

(22) Filed: Jun. 18, 2003

(51) Int. Cl.
 *G06F 15/13* (2006.01)
(52) U.S. Cl. ............ 709/216; 709/203; 709/205; 709/218; 709/219; 707/10; 715/751; 725/60
(58) Field of Classification Search ............ 709/203, 709/205, 216, 218, 219; 707/10; 715/751; 725/60
See application file for complete search history.

(56) References Cited

U.S. PATENT DOCUMENTS

| | | | |
|---|---|---|---|
| 7,035,926 B1* | 4/2006 | Cohen et al. | 709/225 |
| 7,130,880 B1* | 10/2006 | Burton et al. | 709/203 |
| 2002/0026478 A1* | 2/2002 | Rodgers et al. | 709/205 |
| 2004/0044728 A1* | 3/2004 | Gargi | 709/203 |
| 2004/0044774 A1* | 3/2004 | Mangalik et al. | 709/227 |

* cited by examiner

*Primary Examiner*—Jinsong Hu
(74) *Attorney, Agent, or Firm*—Perkins Coie LLP

(57) ABSTRACT

A sharer can share an application object with a viewer over a communication network. An application can register information relating to the application object with a content manager. A listener can read the content manager to display the application objects that are available to be shared with the viewer. Upon selecting from the listener an application object to be shared with the viewer, the sharer can share the application object with the viewer.

13 Claims, 11 Drawing Sheets

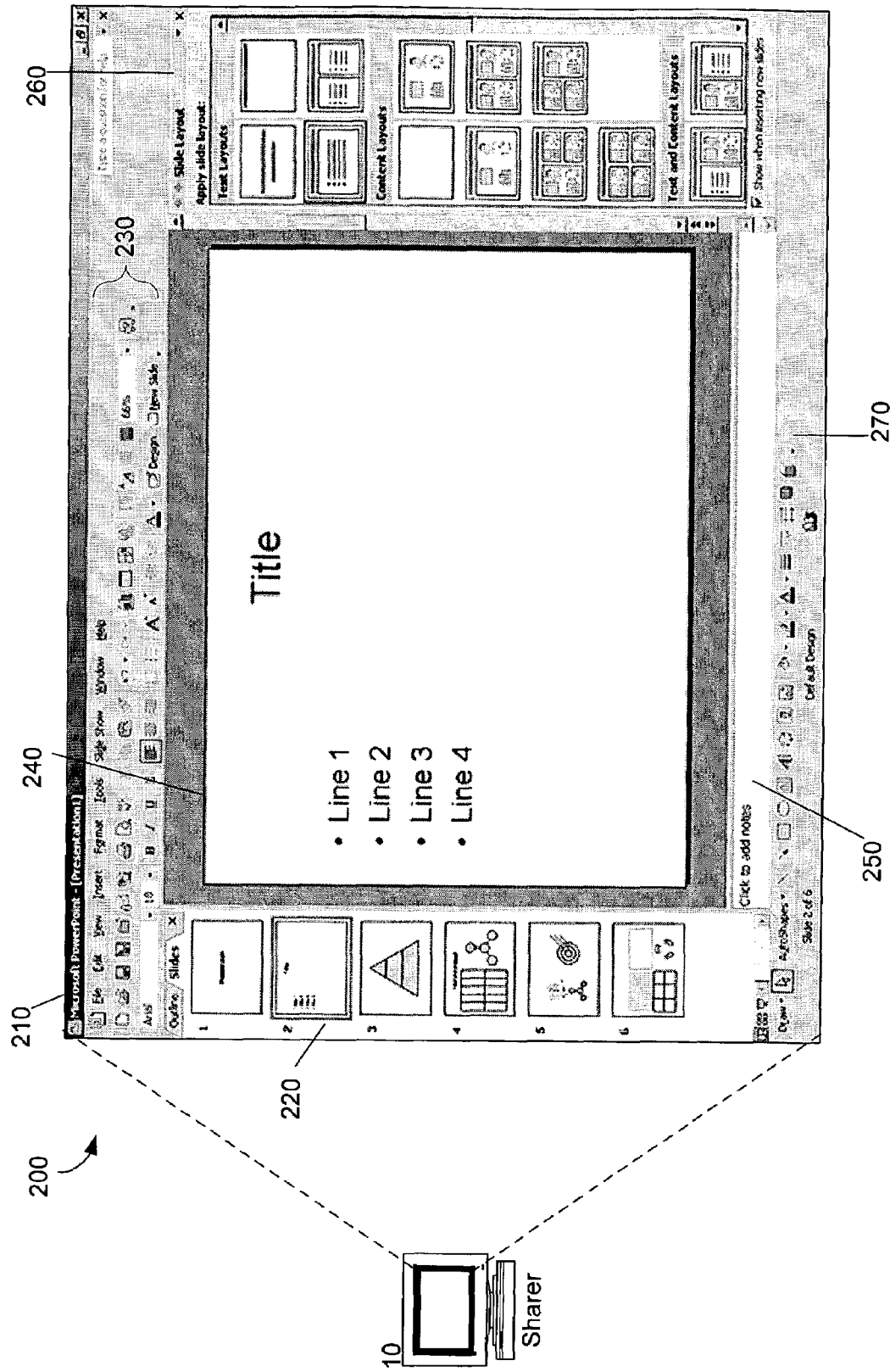

US 7,490,133 B1

CONTEXT-SENSITIVE CONTENT LEVEL SEMANTIC INFORMATION PROPAGATION SYSTEM AND METHOD

FIELD OF THE INVENTION

The present invention is generally directed to application sharing technologies. More particularly described, the present invention supports the identification and sharing of application objects associated with an application between a sharer and a viewer.

BACKGROUND OF THE INVENTION

In the conventional art, application sharing technologies (or remote visualization technologies) allow a sharing computer to display, project, or otherwise share an application, or the images on its display device, with other viewing computers coupled to the sharing computer. For example, by using protocols such as Virtual Network Computing ("VNC"), Remote Desktop Protocol ("RDP"), and NeWS, the sharing computer can share the images it sees on its display device with viewing computers coupled to the sharing computer via a network. Thus, if three applications are being displayed on the sharing computer's display device, such that one application image is staggered over the images of the other two applications, the very same image of the staggered applications will be displayed on the viewing computers.

One significant drawback to the conventional art is that the sharing computer cannot identify or select for sharing a particular region of the images displayed on its display device. Rather, the sharing computer must share all of the images being displayed, including extraneous, unimportant, or uninteresting information associated with the images, such as title bars, toolbars, shortcut keys or icons, and the like. As a result, the viewing computers are forced to display the shared extraneous information.

Additionally, neither the sharing computers nor the viewing computers understand anything about the content or context of what is being shared. For example, an email, a word processing document, and a media stream all appear identical to the sharing computer and the viewing computers. As a result, the sharing computer cannot determine what would be the most efficient, cost-effective, or otherwise appropriate means of sharing the image because it has no understanding of what is being shared. Similarly, the viewing computer cannot determine whether certain regions of the shared images contain important or simply extraneous information. Thus, when a screen reader application on the viewing computer reads the shared images on the viewing computer, it must read everything displayed on the viewing computer, including the extraneous information that is uninteresting or unimportant to the user of the screen reader application.

Accordingly, there is a need in the art for a system and method that provides for the identification of a region of a displayed image. Additionally, there is a need in the art for a system and method that provides for the selection of a region of a displayed image such that the region can be shared with other computers or applications.

SUMMARY OF THE INVENTION

The present invention can solve the aforementioned problems by providing a system and method for identifying and sharing application objects associated with an application. In one aspect of the present invention, an application can identify application objects associated with the application that are available to be shared with a computer. The application can then register the information relating to the application objects with a content manager upon the occurrence of an event. In response to a request to share the application object, the application object is shared with the computer via a communication network.

Various aspects of the present invention may be more clearly understood and appreciated from a review of the following detailed description of disclosed embodiments and by reference to the drawings and claims.

BRIEF DESCRIPTION OF DRAWINGS

FIG. 2a is a diagram illustrating an exemplary image of a presentation application that is displayed on a display device associated with the sharer.

DETAILED DESCRIPTION OF EXEMPLARY EMBODIMENTS

Figure 1A:
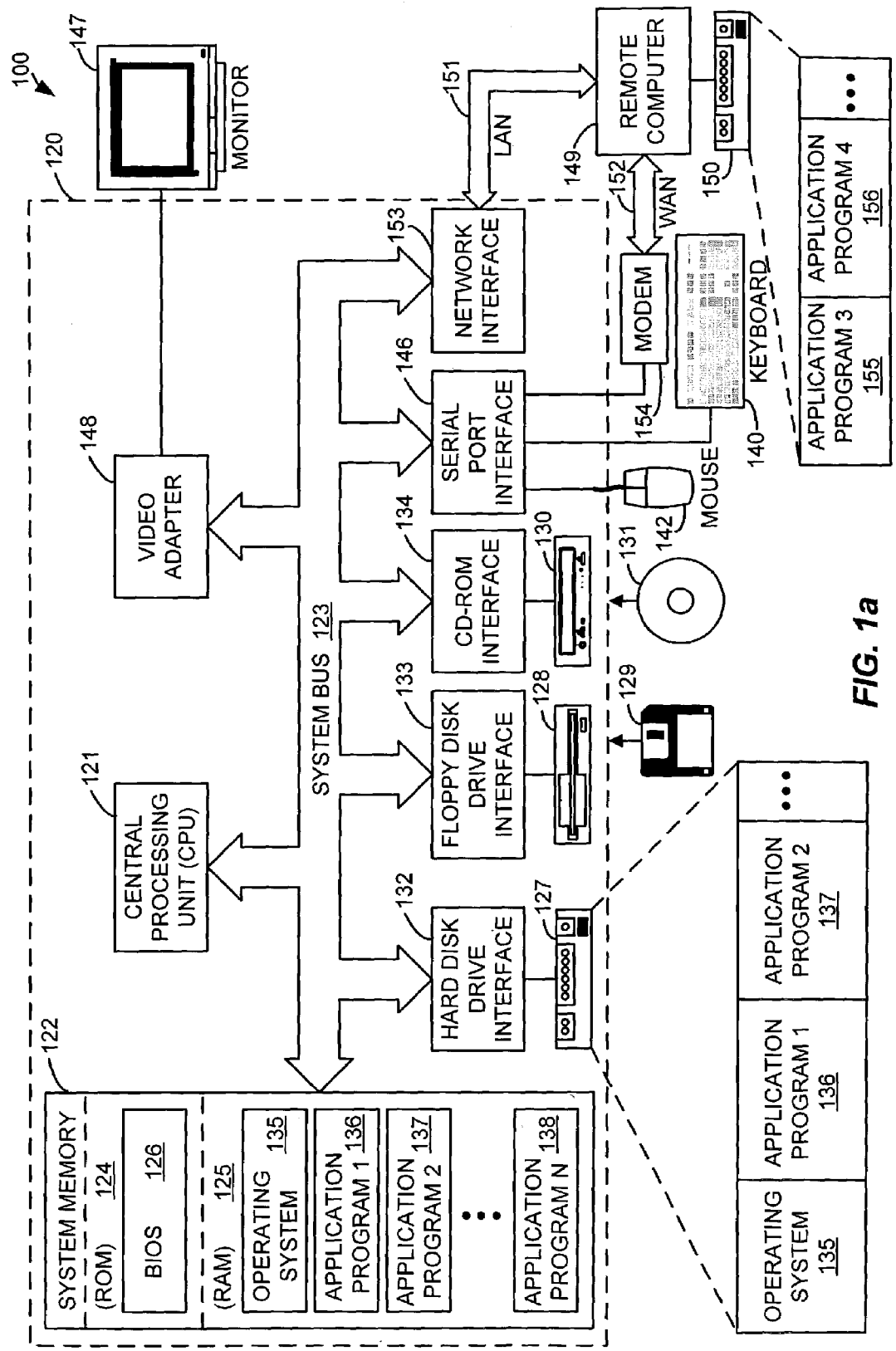
FIG. 1a illustrates an exemplary operating environment in which the present invention may be implemented.

Although the illustrative embodiments will be generally described in the context of identifying and selecting an application object associated with an application on one computer and sharing the application object with another computer for displaying the application object on the other computer, those skilled in the art will recognize that other exemplary embodiments of the present invention may be implemented for any application in which portions or regions of an image are identified and selected for sharing. Additionally, those skilled in the art will recognize that the application objects (or regions of an image) can be shared among computers, among applications (whether on the same computer or on different computers), and among program modules (whether on the same computer or on different computers). Those skilled in the art will also recognize that the sharing of an application object between computers, applications, or program modules can be for any purpose, including for showing information to a user or for processing by an application or program module (with or without the application object being shown to a user), and that the selection of the application object to be shared could be under program control or user control.

In one exemplary embodiment of the present invention, an application can specify which application objects associated with the application can be shared between a sharer and a viewer. The application can also specify under what circumstances the application object can be shared. A sharer can then select which application objects it wishes to share and then can share the selected application object with one or more viewers.

Referring now to the drawings in which like numerals represent like elements throughout the several figures, exemplary embodiments of the present invention and the illustrative operating environment will be described.

FIG. 1a illustrates an exemplary operating environment 100 in which the present invention may be implemented. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures, including a memory bus or memory controller, a peripheral bus, or a local bus, using any of a variety of bus architectures. The system memory 122 includes a read-only memory (ROM) 124 and a random access memory (RAM) 125. A basic input/output system (BIOS) 126, containing the basic routines that help to transfer information between elements within the personal computer 120, such as during start-up, is stored in the ROM 124.

The personal computer 120 further includes a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary operating environment 100 employs a ROM 124, a RAM 125, a hard disk drive 127, a removable magnetic disk 129, and a removable optical disk 131, it should be appreciated by those skilled in the art that other types of computer readable media that can store data that is accessible by a computer may also be used in the exemplary operating environment 100, such as magnetic cassettes, flash memory cards, digital video disks, Bernoulli cartridges, and the like. The drives and their associated computer readable media can provide nonvolatile storage of computer-executable instructions, data structures, program modules, and other data for the personal computer 120.

A number of program modules may be stored on the ROM 124, RAM 125, hard disk drive 127, magnetic disk 129, or optical disk 131, including an operating system 135 and various application programs 136-138, including without limitation word processor applications, presentation applications, drawing applications, image editing applications, and media applications. Program modules include routines, sub-routines, programs, objects, components, data structures, etc., which perform particular tasks or implement particular abstract data types.

A user may enter commands and information to the personal computer 120 through input devices, such as a keyboard 140 and a pointing device 142. The pointing device 142 may include a mouse, a trackball, or an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus (USB), or the like. A display device 147, such as a monitor, may also be connected to system bus 123 via an interface, such as a video adapter 148. In addition to the display device 147, the personal computer 120 may include other peripheral output devices (not shown), such as speakers and a printer.

The personal computer 120 may operate in a networked environment using logical connections to one or more remote computers 149. The remote computer 149 may be another personal computer, a server, a client, a router, a network PC, a peer device, or other common network node. While the remote computer 149 typically includes many or all of the elements described above relative to the personal computer 120, only a memory storage device 150 has been illustrated in FIG. 1a for simplicity. The logical connections depicted in FIG. 1a include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 1B:
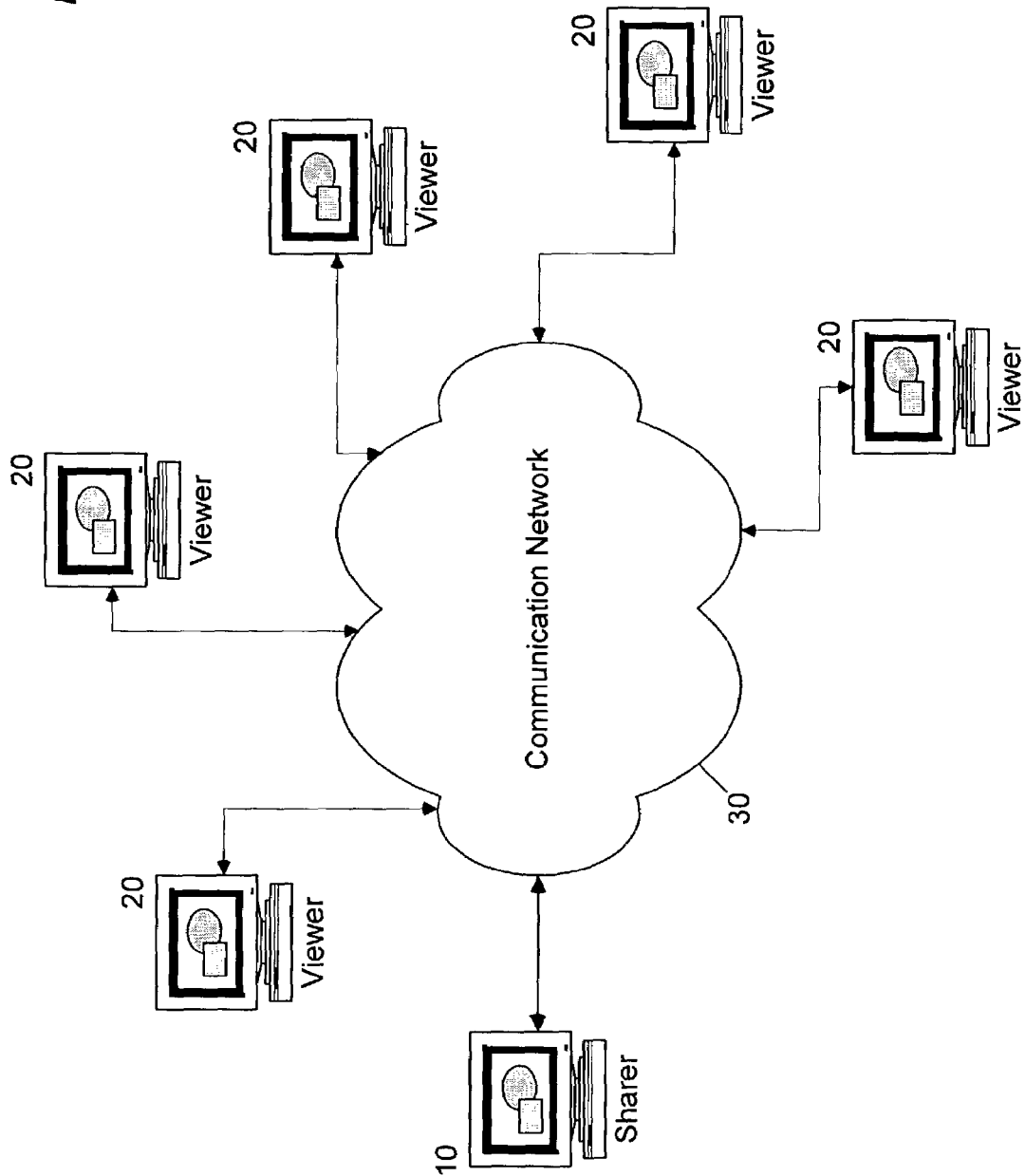
FIG. 1b is a functional block diagram illustrating an exemplary system for identifying, selecting, and sharing a particular region of an image or application ("application object") between a sharer and one or more viewers.

FIG. 1b is a functional block diagram illustrating an exemplary environment 170 for identifying, selecting, and sharing a particular region of an image or application ("application object") between a sharer 10 and one or more viewers 20. In FIG. 1b, a sharer 10 shares an application object with one or more viewers 20 over a communication network 30, such as a wide area network or a local area network. Specifically, the sharer 10 identifies and selects one or more application objects it desires to share with the viewers 20. As the displayed application objects are modified or altered on the sharer 10, the shared images are also are modified or altered on the viewers 20.

FIG. 2a is a diagram illustrating an exemplary image of a presentation application 200 that is displayed on a display device 147 associated with the sharer 10. The presentation application 200 allows a computer user to author, view, and display one or more presentation slides associated with the presentation application 200.

The application 200 comprises a number of application objects 210, 220, 230, 240, 250, 260, 270 that are capable of being identified and selected for sharing with a viewer 20. For example, the presentation application 200 comprises a title bar 210, which identifies the name of the application 200 and the name of the presentation application file that is being displayed; thumbnail images 220, which illustrate each slide associated with the presentation application file; menu bars 230, 270, which comprise shortcut keys or icons that perform certain functions within the presentation application; a slide image 240 of the current slide being displayed within the presentation application file; a text box 250 for adding, editing, or viewing speaker notes associated with the slide image 240; and slide formatting thumbnails 260, which allow a user to select or modify a layout for a particular slide image 240.

Figure 2B:
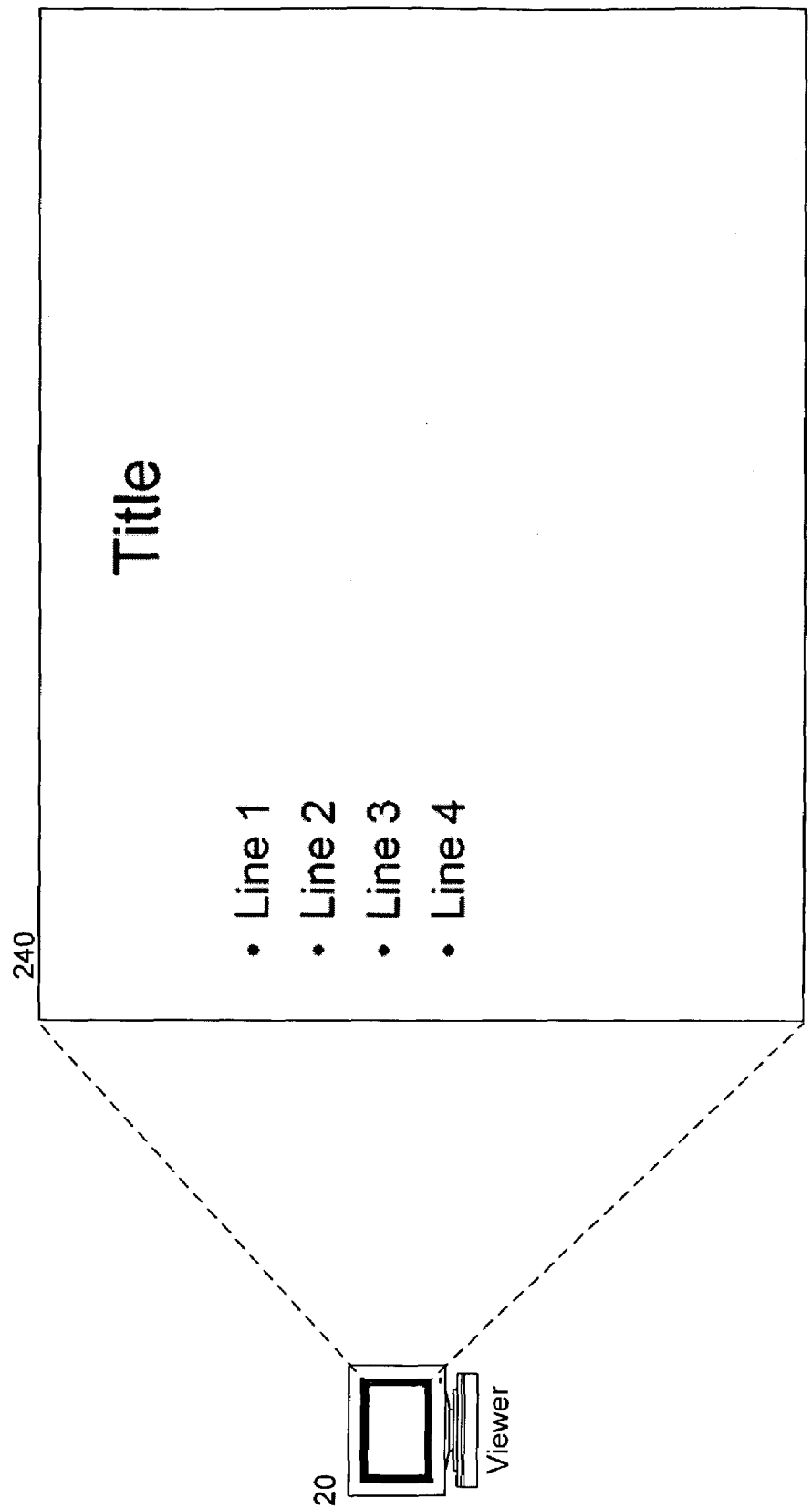
FIG. 2b is a diagram illustrating an exemplary image of a slide image that is displayed on a display device associated with the viewer.

As is recognized by those skilled in the art, a sharer 10 may want to share only specific application objects 210, 220, 230, 240, 250, 260, 270 displayed on its display device 147 with one or more viewers 20. For example, certain application objects, such as the title bar 210 and the menu bars 230, 270 may not be important or interesting to the sharer 10 or the viewer 20. Rather, the sharer 10 and the viewer 20 may only be interested in sharing and viewing the actual content of the slide 240 or the speaker notes 250 associated with the slide 240. Accordingly, if the sharer 10 selects to share only the slide 240 with the viewer 20, then the viewer 20 will only view on its display device 147 the slide image 240, as is illustrated in FIG. 2b.

Figure 3A:
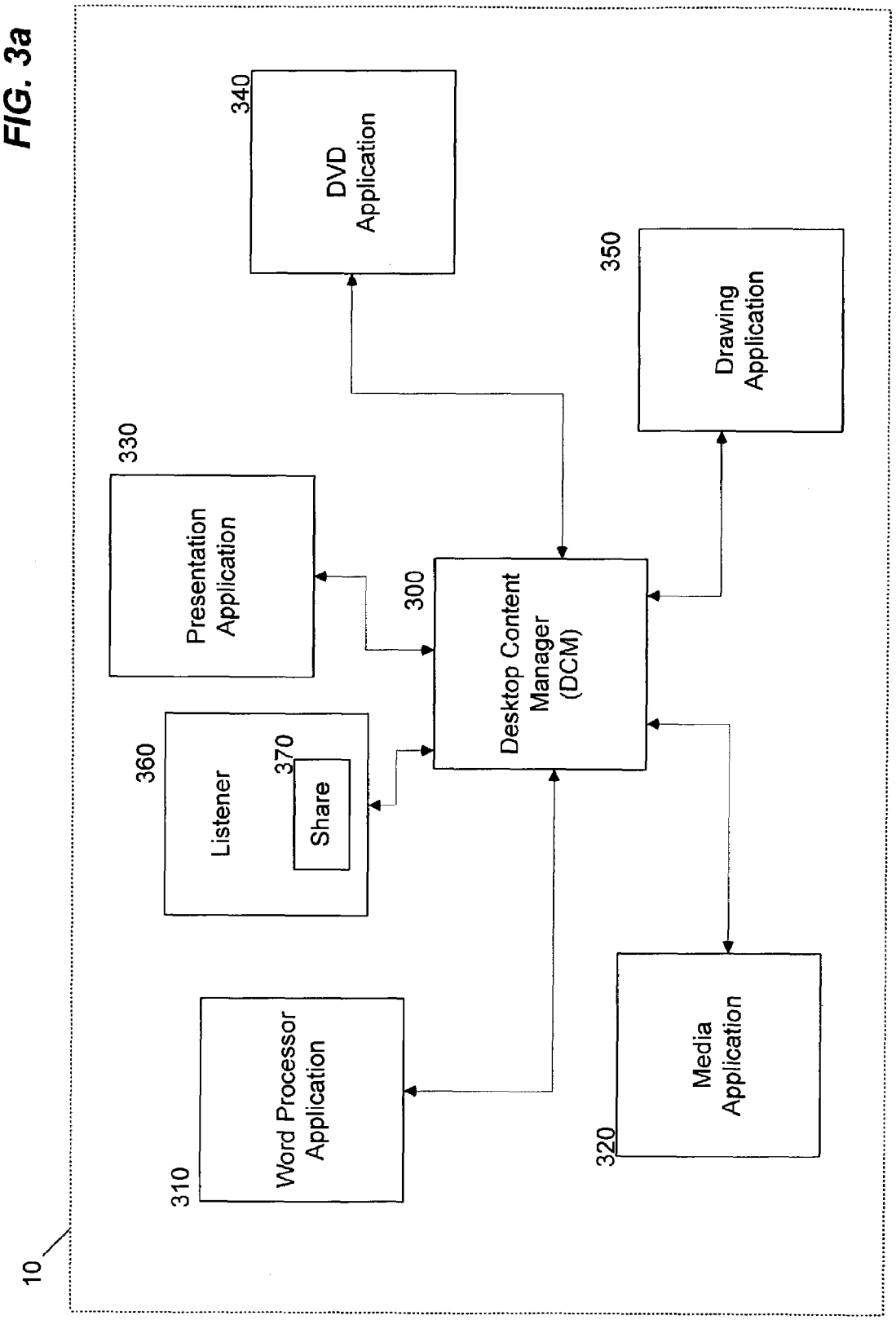
FIG. 3a is a functional block diagram illustrating exemplary components of a sharer.

FIG. 3a is a functional block diagram illustrating exemplary components of a sharer 10. The exemplary sharer 10 comprises a desktop content manager 300. The exemplary desktop content manager 300 maintains information about one or more applications 310, 320, 330, 340, 350 and one or more application objects associated with each application 310, 320, 330, 340, 350 as the applications 310, 320, 330, 340, 350 are executed, initialized, or modified by the sharer 10. Exemplary information comprises the name associated with the application object; file binding information, including the file name, the file handle, the last modification time, file properties, and other similar information; digital rights management information; window binding information, including the window handle or other unique window identifier, the coordinates of the window, the size of the window, the window title, the window pointer, the type of the window, whether the window is serializable, whether the window is static (for example, a photo) or dynamic (for example, a video), and other similar information; share type information, which identifies the ways in which the application object can be shared, including, for example, whether the application object can be shared by email attachment, by Graphics Device Interface ("GDI") sharing, or by a shared URL; and system requirements information, including video depth, CPU needs, and other similar information.

In one exemplary embodiment, the desktop content manager 300 queries an application 310, 320, 330, 340, 350 for the information associated with its application objects. The desktop content manager 300 may query the applications 310, 320, 330, 340, 350 upon the occurrence of one or more events. For example, the desktop content manager 300 may query the application for information upon the initialization of the application 310, 320, 330, 340, 350. Similarly, the desktop content manager 300 may query the applications 310, 320, 330, 340, 350 at certain time intervals. In response to the query, the application 310, 320, 330, 340, 350 provides the desktop content manager 300 with the information associated with the application objects that the application 310, 320, 330, 340, 350 wants to make available to share.

In another exemplary embodiment, each application 310, 320, 330, 340, 350 decides which of the application objects associated with the application to register with the desktop content manager 300 and then registers the information with the desktop content manager 300. The application 310, 320, 330, 340, 350 registers the information with the desktop content manager 300 upon the occurrence of a particular event. Exemplary events include registering the information at certain time intervals or upon the initialization of the application. The application 310, 320, 330, 340, 350 may also register the information with the desktop content manager 300 as the state of the application 310, 320, 330, 340, 350 changes.

By way of example, if a word processor application 310 is configured to register information relating to its application objects upon initialization, then it first decides which application objects it should make available for sharing with a viewer 20. It then registers with the desktop content manager 300 the information relating to those specific application objects. Similarly, when a media application 320, a presentation application 330, a DVD application 340, a drawing application 350, or any other application is configured to register information relating to its application objects, then each of these applications 320, 330, 340, 350 registers information about one or more of its application objects with the desktop content manager 300.

The sharer also comprises a listener 360. An exemplary listener 360 identifies or enumerates the application objects that have been registered with the desktop content manager 300. In one exemplary embodiment of the present invention, the listener 360 first determines which of the application objects registered with the desktop content manager 300 are capable of being shared with a viewer 20. For example, the listener 360 may make this determination based upon the digital rights management information or the share type information associated with each application object. The listener 360 then enumerates only those application objects that can be shared with a viewer 20 based upon this determination. In other words, the listener 360 determines, for each application object, whether the application object is shareable in accordance with digital rights management information or share type information. If the application object is shareable, then the listener 360 identifies or lists the application object as being capable of being shared with the viewer 20. The sharer 10 then shares a particular application object by selecting the application object from the application objects identified by the listener 360 and selecting the "share" command 370.

In another exemplary embodiment of the present invention, the listener 360 enumerates or identifies every application object that has been registered with the desktop content manager 300. Once the sharer 10 selects a particular application object to be shared with a viewer 20, the listener 360 then determines whether the selected application object is shareable. The listener 360 can make this determination based upon the digital rights management information or the share type information associated with the application object.

Figure 3B:
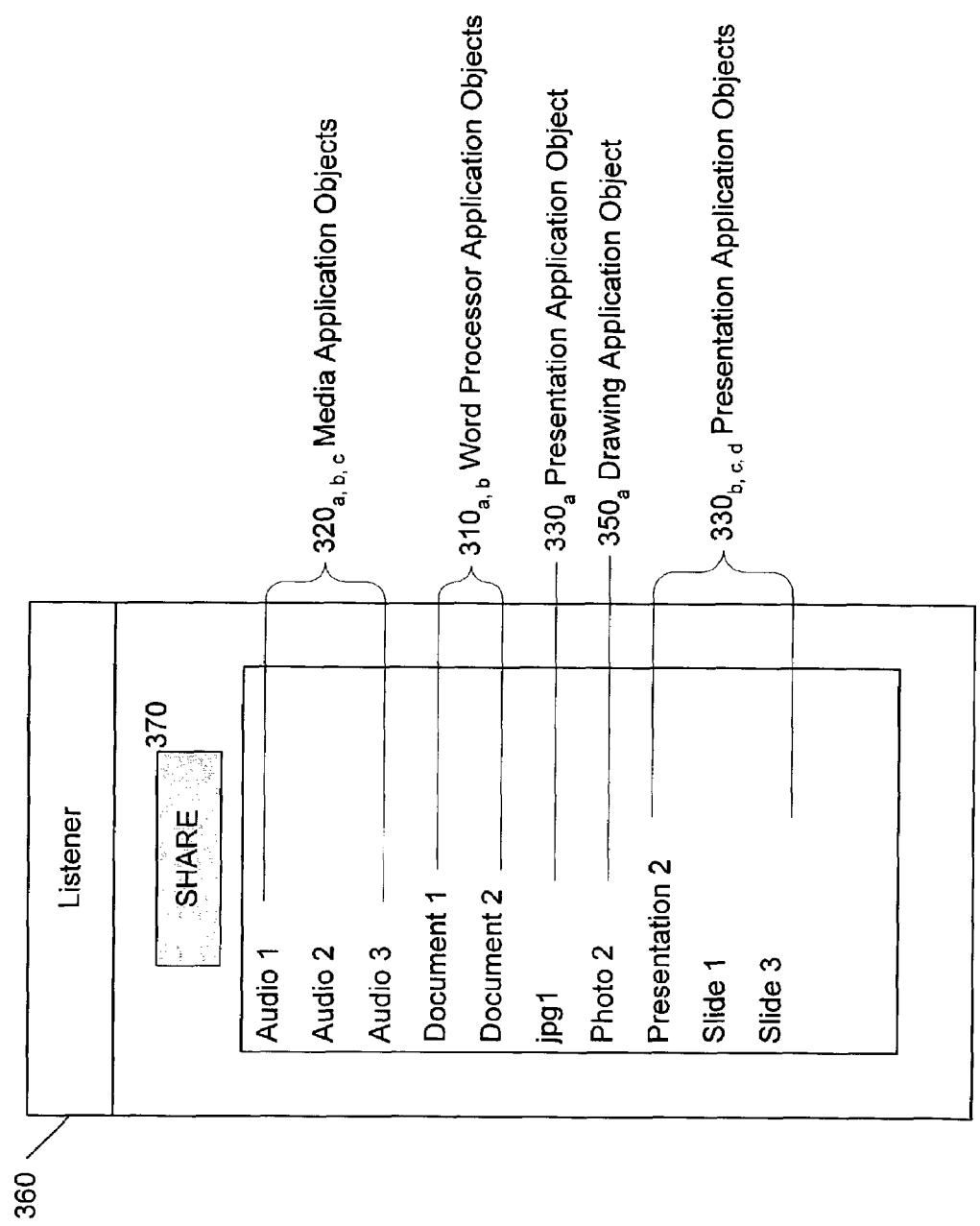
FIG. 3b is a diagram illustrating an exemplary listener.

FIG. 3b is a diagram illustrating an exemplary listener 360. The listener 360 comprises a "share" command 370. Once a sharer 10 has selected an application object to be shared with a viewer 20 by selecting that application object from the list of enumerated application objects, the sharer 10 completes the process of sharing the application object by selecting the share command 370.

For example, in FIG. 3*b*, a media application 320 has registered information relating to three application objects (audio files) 320*a*, 320*b*, 320*c* associated with the media application 320 with the desktop content manager 300. The listener 360 has enumerated and made available for sharing the three audio files 320*a*, 320*b*, 320*c*. Similarly, a word processor application 310 has registered information relating to two application objects (documents) 310*a*, 310*b* with the desktop content manager 300. The listener 360 has enumerated and made available for sharing those two application objects 310*a*, 310*b*. Additionally, the listener 360 has enumerated and made available for sharing four presentation application objects (a .jpg file, a presentation, and two slides) 330*a*, 330*b*, 330*c*, 330*d*. Finally, the listener 360 has enumerated and made available for sharing one drawing application object (a photograph) 350*a*. If a sharer 10 wants to share with viewer 20 any of these application objects, then the sharer 10 selects the application object from the enumerated list in the listener 360 and then executes the share command 370 to share the application object with the viewer 20.

Certain steps in the processes described below in connection with FIGS. 4 through 7 must naturally precede others for the present invention to function as described. However, the present invention is not limited to the order of the steps described, if such order or sequence does not alter the functionality of the present invention. It is recognized that some steps may be performed before or after other steps without departing from the scope and the spirit of the present invention.

Figure 4A:
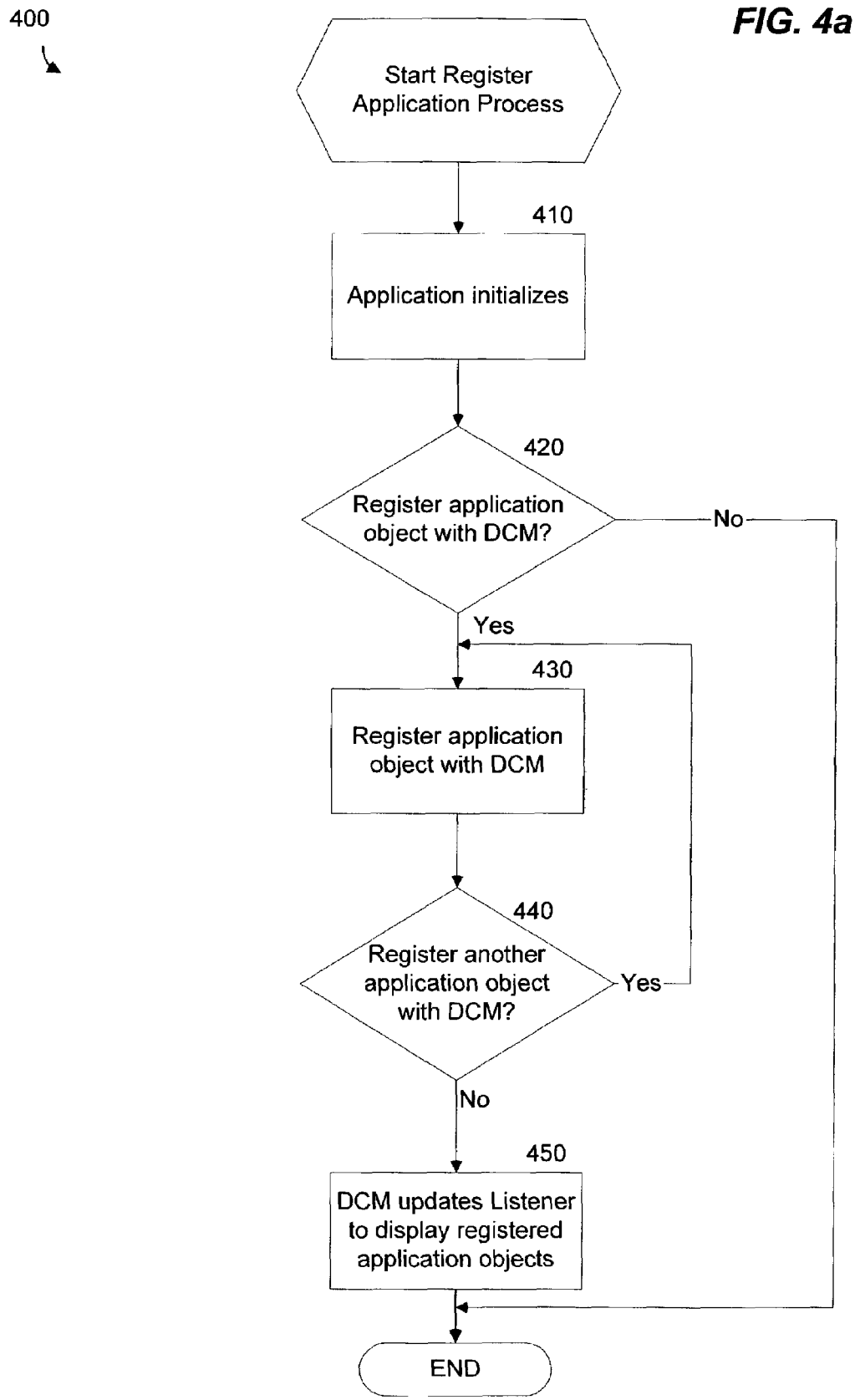
FIG. 4a is a logic flow diagram illustrating an exemplary process for registering one or more application objects with a desktop content manager upon the initialization of the application on the sharer.

FIG. 4*a* is a logic flow diagram illustrating an exemplary process 400 for registering one or more application objects with a desktop content manager 300 upon the initialization of the application 310, 320, 330, 340, 350 on the sharer 10. Step 410 is the first step in the exemplary process 400.

In Step 410, the application 310, 320, 330, 340, 350 initializes on the sharer 10. In Step 420, the application 310, 320, 330, 340, 350 determines whether it should register a particular application object associated with the application 310, 320, 330, 340, 350 with the desktop content manager 300. For example, in the case of a presentation application 330, the presentation application 330 may be coded or configured to register only certain application objects associated with the presentation application 330, such as the slide image 240 and the text box 250.

If the application 310, 320, 330, 340, 350 is configured to register an application object with the desktop content manager 300, then in Step 430, the application 310, 320, 330, 340, 350 registers information relating to the application object with the desktop content manager 300. If the application 310, 320, 330, 340, 350 is not configured to register an application object, then the process ends.

In Step 440, the application 310, 320, 330, 340, 350 determines whether it should register another application object associated with the application 310, 320, 330, 340, 350 with the desktop content manager 300. If the application 310, 320, 330, 340, 350 is configured to register another application object with the desktop content manager 300, then the process repeats at Step 430.

In Step 450, the desktop content manager 300 updates the listener 360 to identify and display for selection and sharing the application objects associated with the applications 310, 320, 330, 340, 350 that have been registered with the desktop content manager 300.

Figure 4B:
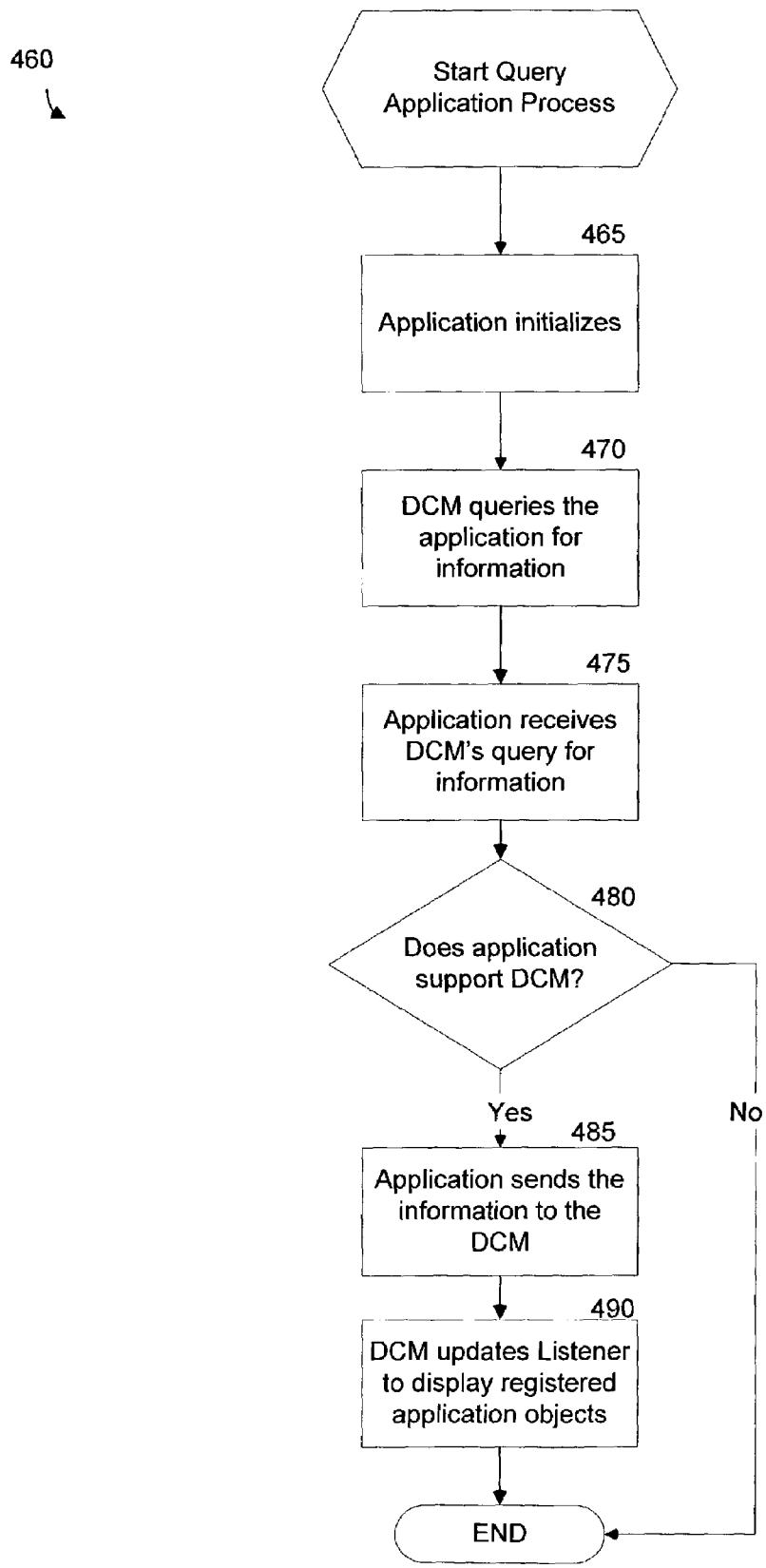
FIG. 4b is a logic flow diagram illustrating another exemplary process for registering one or more application objects with a desktop content manager by querying the applications on the sharer for information.

FIG. 4*b* is a logic flow diagram illustrating another exemplary process 460 for registering one or more application objects with a desktop content manager 300 by querying the applications 310, 320, 330, 340, 350 on the sharer 10 for information. Step 465 is the first step in the exemplary process 460.

In Step 465, the application 310, 320, 330, 340, 350 initializes on the sharer 10. In Step 470, the desktop content manager 300 queries the application 310, 320, 330, 340, 350 for information relating to the application objects to be shared by the desktop content manager 300. In Step 475, the application 310, 320, 330, 340, 350 receives the desktop content manager's 300 query for information. In Step 480, the application 310, 320, 330, 340, 350 determines whether it is capable of registering, or is configured to register, information associated with an application object with the desktop content manager 300. If the application 310, 320, 330, 340, 350 is not capable of registering information associated with an application object with the desktop content manager 300, then the process 460 ends.

If the application 310, 320, 330, 340, 350 is capable of registering information associated with an application object with the desktop content manager 300, then in Step 485, the application 310, 320, 330, 340, 350 sends the desktop content manager 300 the information. In Step 490, the desktop content manager 300 updates the listener 360 to identify and display for selection and sharing the application objects associated with the applications 310, 320, 330, 340, 350 that have been registered with the desktop content manager 300.

Figure 5:
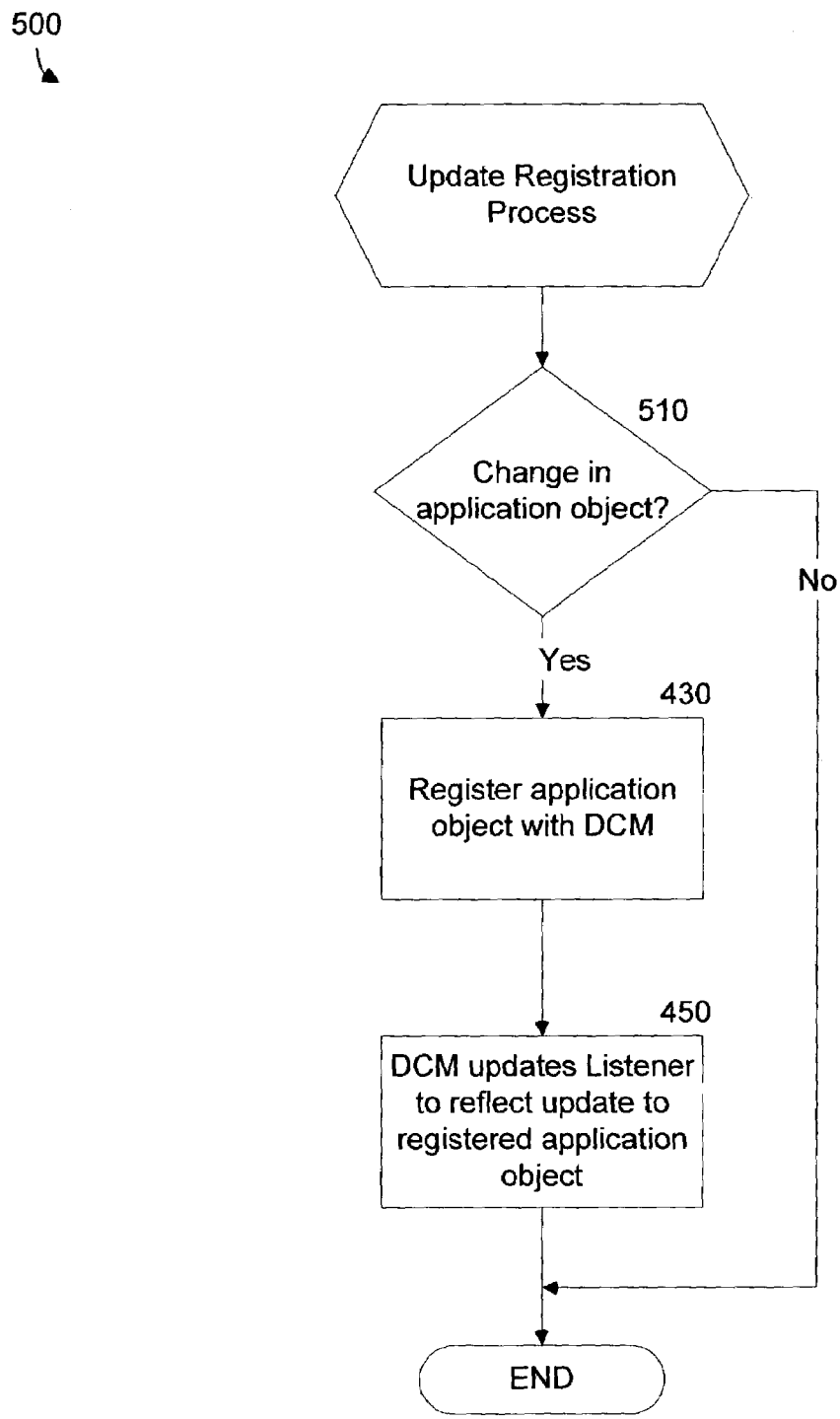
FIG. 5 is a logic flow diagram illustrating an exemplary process for updating a registration with the desktop content manager that relates to an application object.

FIG. 5 is a logic flow diagram illustrating an exemplary process 500 for updating a registration with the desktop content manager 300 that relates to an application object. Step 510 is a first step in the exemplary process 500.

In Step 510, the application 310, 320, 330, 340, 350 determines whether there has been a change in the application object associated with the application 310, 320, 330, 340, 350. In one exemplary embodiment, the application 310, 320, 330, 340, 350 determines if the appearance or the display of the application object has changed. In another exemplary embodiment, the application 310, 320, 330, 340, 350 determines if any relevant property associated with the application 310, 320, 330, 340, 350 has changed. If the application object has not changed, then the process 500 ends. However, if the application object has changed, then in Step 430, the application 310, 320, 330, 340, 350 registers the application object with the desktop content manager 300. In Step 450, the desktop content manager 300 updates the listener 360 to identify the registered application object that has been updated.

In an another exemplary embodiment of the present invention, if a change in the application object has occurred in Step 510, then the desktop content manager 300 queries the application 310, 320, 330, 340, 350 for information relating to the application object. The application 310, 320, 330, 340, 350 then sends the information relating to the application object to the desktop content manager 300.

Figure 6:
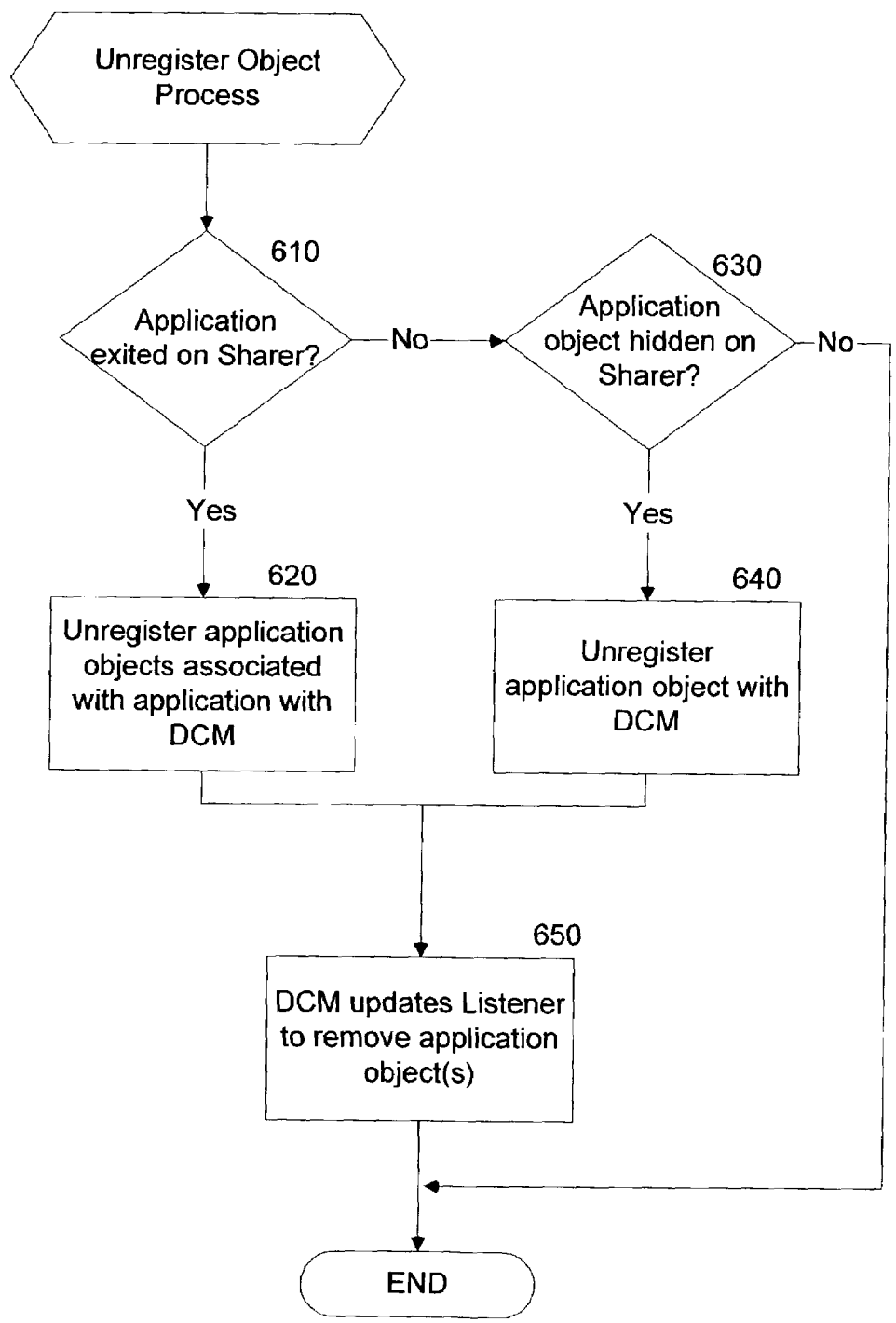
FIG. 6 is a logic flow diagram illustrating an exemplary process for unregistering an application object with the desktop content manager.

FIG. 6 is a logic flow diagram illustrating an exemplary process 600 for unregistering an application object with the desktop content manager 300. Step 610 is the first step in the exemplary process 600.

In Step 610, the application 310, 320, 330, 340, 350 determines whether the sharer 10 has exited the application 310, 320, 330, 340, 350. If the sharer 10 has exited the application 310, 320, 330, 340, 350, then in Step 620, the application 310, 320, 330, 340, 350 unregisters all application objects associated with the application 310, 320, 330, 340, 350 with the desktop content manager 300. If, in Step 610, the sharer 10 has not exited an application 310, 320, 330, 340, 350, then in Step 630, the application 310, 320, 330, 340, 350 determines whether the sharer 10 has minimized or otherwise hidden from view on the display the one or more application objects associated with the application 310, 320, 330, 340, 350 on the sharer 10. If the application object has been hidden on the sharer 10, then in Step 640, the application 310, 320, 330, 340, 350 unregisters the application object with the desktop content manager 300. In Step 650, the desktop content manager 300 updates the listener 360 to remove all application objects that have been unregistered with the desktop content manager 300.

Figure 7:
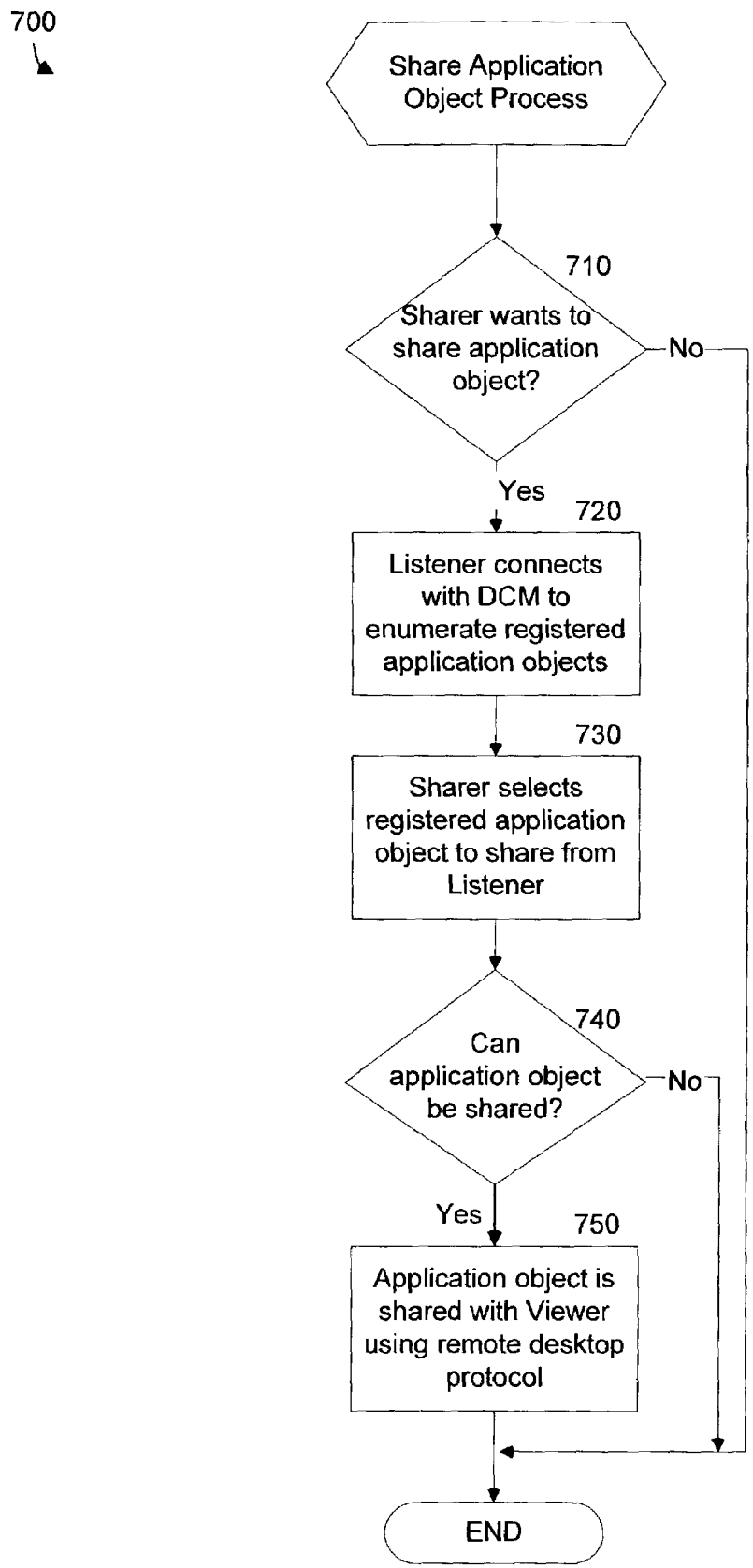
FIG. 7 is a logic flow diagram illustrating an exemplary process for sharing an application object among a sharer and one or more viewers.

FIG. 7 is a logic flow diagram illustrating an exemplary process 700 for sharing an application object among a sharer 10 and one or more viewers 20. Step 710 is the first step in the exemplary process 700.

In Step 710, the sharer 10 determines whether it wants to share an application object with one or more viewers 20. If the sharer 10 does not want to share an application object with one or more viewers 20, then the process 700 ends. However, if the sharer 10 wants to share an application object with a viewer 20, then in Step 720, the listener 360 connects or communicates with the desktop content manager 300 to identify and enumerate the registered application objects that are available to be shared with the viewer 20. In Step 730, the sharer 10 selects for sharing one or more registered application objects that are enumerated by the listener 360.

In Step 740, the listener 360 determines whether the application object that has been selected by the sharer 10 can be shared with the one or more viewers 20. In one exemplary embodiment of the present invention, the listener 360 determines whether the application object can be shared based upon the share type information or the digital rights management information associated with the application object. If the application object cannot be shared, then the process 700 ends. However, if the application object can be shared, then in Step 750, the application object is shared among the sharer 10 and the one or more viewers 20 using a file sharing protocol, such as remote desktop protocol.

Those skilled in the art will appreciate that the exemplary system allows an application to identify which specific application objects may be shared and under what circumstances the application object can be shared. The application can register information relating to the application objects with a desktop content manager. The desktop content manager can then manage the information as the application objects are modified or altered. Once the shareable application objects have been identified and registered, a sharer can share the application object with one or move viewers across a communication network.

It should be understood that the foregoing relates only to illustrative embodiments of the present invention, and that numerous changes may be made therein without departing from the scope and spirit of the invention as defined by the following claims.

We claim:

1. A method in a first computer for sharing one of a plurality of application objects associated with an application between the first computer and a second computer coupled to a communication network, an application object being a region of an image displayed by the application with which it is associated, comprising the steps of:

under control of the application, identifying application objects that are capable of being shared with the second computer; and registering the identified application objects upon the occurrence of events with a content manager, the events including initializing of the application and modifying of an application object;

under control of the content manager, receiving from a user at the first computer an indication to start sharing registered application objects with the second computer;

receiving from the user a selection of one of the registered application objects to be shared with the second computer; and sharing the selected application object with the second computer via the communication network, responsive to a selection of one of the registered application object to be shared with the second computer, so the shared application object can be displayed on the second computer and updated when the application registers a modification to the selected application object, wherein the registered application objects representing regions of the image can be selectively shared rather than sharing only the entire image with all the application objects.

2. A computer-readable storage medium storing computer-executable instructions for performing the steps recited in claim 1.

3. The method of claim 1, wherein the registering step comprises the step of registering information for each application object associated with the application, wherein the information uniquely identifies the application object.

4. The method of claim 3, wherein the information comprises a window binding information.

5. A method in a first computer for sharing objects associated with an application executing on the first computer, the objects being shared with a second computer, the objects being regions of an image displayed by the application executing of the first computer, the method comprising the steps of:

querying the application for information relating to the objects that are regions of an image the application executing on the first computer;

determining whether each object is capable of being shared;

receiving the information about each object associated with the application responsive to the querying, wherein the information describes the objects that are determined to be capable of being shared;

receiving from a user at the first computer a request to share with the second computer an object that is capable of being shared; and in response to receiving the request, sharing the requested object with the second computer wherein the sharing includes updating the shared object at the second computer when the application executing at the first computer modifies the shared object so that regions of the image displayed by the application executing at the first computer can be selectively shared with the second computer rather than sharing only the entire image with all the regions.

6. A computer-readable storage medium storing computer-executable instructions for performing the steps recited in claim 5.

7. The method of claim 5, wherein the sharing step comprises sharing the selected object with the second computer using a remote desktop protocol.

8. The method of claim 5, wherein the object comprises a window and the information comprises coordinates of the window on the first computer.

9. A computer-readable storage medium of a first computer system coupled to a distributed computing network, the computer-readable storage medium storing an application operative to share a selected one of a plurality of application objects residing on the first computer system with a second computer system coupled to the computer network, each application object being a region of an image displayed by the application, the application operative to complete steps comprising:

maintaining registration information for each of the plurality of application objects, wherein the registration information for an application object describes an application object that is a region of an image displayed by an application; and responsive to a request to share the selected application object with the second computer system, identifying a subset of the application objects that are capable of being shared with the second computer system, and when the selected application object is in the identified subset of application objects that are capable of being shared with the second computer system, sharing the selected application object with the second computer system via the computer network, so that regions of the image displayed by an application executing at the first computer system can be selectively shared with the second computer system rather than sharing only the entire image displayed by the application with all the regions.

10. The computer-readable storage medium of claim 9, operative to complete the step comprising receiving the registration information for the application objects from an application associated with the application objects.

11. The computer-readable storage medium of claim 10, operative to complete the steps comprising:

querying the application associated with the application objects for the registration information; and receiving the registration information from the application responsive to the query.

12. The computer-readable storage medium of claim 10, operative to complete the step comprising unregistering the application objects upon an exiting of the application associated with the application objects on the first computer system.

13. The computer-readable storage medium of claim 9, operative to complete the steps comprising:

displaying the subset of the application objects on a listener, wherein the listener is coupled to the first computer system; and selecting the selected application object for sharing from the listener.

* * * * *